US 9,225,951 B2

(12) United States Patent
Damberg et al.

(10) Patent No.: US 9,225,951 B2
(45) Date of Patent: Dec. 29, 2015

(54) GENERATING ALTERNATIVE VERSIONS OF IMAGE CONTENT USING HISTOGRAMS

(75) Inventors: Gerwin Damberg, Vancouver (CA); Anders Ballestad, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/004,771

(22) PCT Filed: Mar. 16, 2012

(86) PCT No.: PCT/US2012/029364
§ 371 (c)(1),
(2), (4) Date: Sep. 12, 2013

(87) PCT Pub. No.: WO2012/125892
PCT Pub. Date: Sep. 20, 2012

(65) Prior Publication Data
US 2014/0002737 A1     Jan. 2, 2014

Related U.S. Application Data

(60) Provisional application No. 61/453,922, filed on Mar. 17, 2011, provisional application No. 61/453,924, filed on Mar. 17, 2011, provisional application No. 61/474,733, filed on Apr. 12, 2011.

(51) Int. Cl.
*G09G 5/00*     (2006.01)
*G09G 5/02*     (2006.01)
(Continued)

(52) U.S. Cl.
CPC .... *H04N 9/64* (2013.01); *G06T 5/009* (2013.01); *G06T 5/40* (2013.01); *G06T 11/001* (2013.01);
(Continued)

(58) Field of Classification Search
CPC ................. G06T 11/001; G06T 2207/10016; G06T 2207/10024; G06T 2207/20016; G06T 2207/20208; G06T 5/009; G06T 5/40; H04N 9/64
See application file for complete search history.

(56) References Cited

U.S. PATENT DOCUMENTS 5,668,890 A * 9/1997 Winkelman .................. 382/167
6,128,407 A   10/2000 Inoue
(Continued)

FOREIGN PATENT DOCUMENTS

JP   2003-337580    11/2003
JP   2005-027168    1/2005
(Continued)

OTHER PUBLICATIONS

Pouli, T. et al., "Progressive Histogram Reshaping for Creative Color Transfer and Tone Reproduction," Symposium on Non-Photorealistic Animation and Rendering, Jun. 2010.
Reinhard, E. et al., "Color Transfer Between Images," IEEE CG & A special issue on Applied Perception vol. 21, No. 5, pp. 34-41, Sep.-Oct. 2001.
(Continued)

*Primary Examiner* — Sing-Wai Wu

(57) ABSTRACT

One or more versions of video or other image content may be generated by obtaining first histogram data for a first version of the video content; obtaining a second version of the video content; obtaining second histogram data for the second version of the video content; generating a mapping from the second version of the video content to an additional version of the video content by performing a number of iterations of a progressive histogram matching algorithm, the number of iterations being fewer than a maximum number of iterations of the progressive histogram matching algorithm; and applying the mapping to generate the additional version of the video content from the second version of the video content.

10 Claims, 5 Drawing Sheets

(51) Int. Cl.
*H04N 11/06* (2006.01)
*H04N 9/64* (2006.01)
*G06T 5/00* (2006.01)
*G06T 5/40* (2006.01)
*G06T 11/00* (2006.01)

(52) U.S. Cl.
CPC .............. *G06T 2207/10016* (2013.01); *G06T 2207/10024* (2013.01); *G06T 2207/20016* (2013.01); *G06T 2207/20208* (2013.01)

(56) References Cited

U.S. PATENT DOCUMENTS

| | | | |
|---|---|---|---|
| 6,850,642 | B1 | 2/2005 | Wang |
| 7,064,864 | B2 | 6/2006 | Takahashi |
| 2005/0116942 | A1* | 6/2005 | Vander Jagt et al. ......... 345/207 |
| 2008/0297451 | A1* | 12/2008 | Marcu ............................. 345/77 |
| 2008/0297460 | A1 | 12/2008 | Peng |
| 2008/0304087 | A1 | 12/2008 | Shin |
| 2009/0257652 | A1 | 10/2009 | Liu |
| 2009/0285283 | A1 | 11/2009 | Gao |
| 2011/0316973 | A1 | 12/2011 | Miller |
| 2013/0038790 | A1 | 2/2013 | Atkins |
| 2013/0120656 | A1 | 5/2013 | Wilson |

FOREIGN PATENT DOCUMENTS

| | | |
|---|---|---|
| JP | 2009-049627 | 3/2009 |
| WO | 2009/016137 | 2/2009 |

OTHER PUBLICATIONS

Ward, G., "A General Approach to Backwards-Compatible Delivery of High Dynamic Range Images and Video," Proceedings of the Fourtenth Color Imaging Conference, Nov. 2006.

Pouli, T. et al, "Progressive Color Transfer for Images of Arbitrary Dynamic Range," vol. 35, No. 1, Nov. 5, 2010, pp. 67-80.

Morovic, J. et al, "Accurate 3D Image Colour Histogram Transformation," Pattern Recognition Letters, vol. 24, No. 11, Jul. 1, 2003.

Ruderman, D. L. et al. "Statistics of Cone Responses to Natural Images: Implications for Visual Coding," Journal of the Optical Society of America A, vol. 15, No. 8, pp. 2036-2045, Aug. 1998.

Kouassi, R.K. et al., "Application of the Karhunen-Loeve Transform for Natural Color Images Analysis," In Proc. of the 31st Asilomar Conference on Signals, Systems & Computers (ACSSC 1997) vol. 2, pp. 1740-1744, Pacific Grove, California, USA, Date of Conference: Nov. 2-5, 1997.

Ionita, M.C. et al., "Benefits of Using Decorrelated Color Information for Face Segmentation/Tracking Advances," Optical Technologies, vol. 2008, 8 pages.

Senanayake, C.R. et al, "Colour Transfer by Feature Based Histogram Registration," British Machine Vision Association, 2007.

Mantiuk R. et al. "Color Correction for Tone Mapping" Eurographics 2009.

Toma, T. et al "Still Image Coding Technique Using Internet Photo-Sharing Service", IEICE Transactions, The Institute of Electronics, Information and Communication Engineers, publication date: Aug. 1, 2008, vol. J91-D, No. 8, pp. 1959-1962.

* cited by examiner

GENERATING ALTERNATIVE VERSIONS OF IMAGE CONTENT USING HISTOGRAMS

CROSS-REFERENCE TO RELATED APPLICATIONS

This application claims priority to U.S. Provisional Patent Application Nos. 61/453,922 filed 17 Mar. 2011; 61/453,924 filed 17 Mar. 2011 and 61/474,733 filed 12 Apr. 2011, hereby incorporated by reference in its entirety.

TECHNICAL FIELD

The invention relates to displaying and processing images and to data communication. The invention has particular application to encoding, decoding, storing and transmitting image data. Example embodiments provide apparatus and methods for encoding and decoding video data that includes a plurality of versions in which the video data is based on different color gamuts.

Displays such as televisions, computer monitors, displays in portable devices, special purpose displays such as virtual reality displays, vehicle simulators, advertising displays, stadium displays, and the like are widespread. State of the art displays are capable of displaying fine nuances of color and tone.

A wide range of display technologies are now available. For example, there are plasma displays, LCD displays backlit by a variety of types of light sources such as LEDs of various types, fluorescent lamps or high-intensity incandescent lamps, CRT-based displays, digital cinema displays, OLED displays etc. A particular display combines display hardware with video signal processing components that receive video signals and drive display hardware to display video content of the video signals.

Different displays may vary significantly with respect to features such as: the color gamut that can be reproduced by the display;
 the maximum brightness achievable;
 contrast ratio;
 resolution;
 acceptable input signal formats;
 color depth;
 white level;
 black level;
 white point;
 grey steps;
 etc.

Because displays can perform very differently, the same image content may appear different when viewed on different displays. Image content that is pleasing to look at when viewed on one display may be less pleasing when viewed on another display having different capabilities. Image content that matches a creator's creative intent when displayed on some displays may depart from the creator's creative intent in one or more ways when viewed on other displays.

The perception of color and luminance is affected by ambient conditions. Video or other images presented under theater conditions (low ambient lighting) may be perceived by viewers significantly differently than the same video or other images would be perceived when viewed under conditions with significant ambient light. Further, the characteristics (such as the color temperature) of ambient light can affect a viewer's perception of video content.

The creator of a video production or other image may set tones and colors of pixels in the image so that, when viewed, the image has a desired appearance which agrees with the creator's creative intent. For example, a creator may wish some scenes to have a darker, more oppressive, feel than others. The creator may wish certain features depicted in a scene to stand out or to be less prominent. The creator may wish to have colors seem extra vivid in some scenes and more muted in others. Adjusting tones and colors of pixels in an image may include performing color grading (or 'color timing') on the source video data. Color grading may be performed using a hardware/software system that permits a user to change the video data in various ways to achieve a desired appearance.

Since the choice of display on which content is viewed and the ambient lighting conditions at the time the content is viewed can affect viewers' perceptions of the content being viewed, it would be ideal to have the creator perform color grading separately for every display on which the video production might be viewed and for all ambient conditions under which the video production might be viewed. Viewers could then obtain customized versions of the production optimized for viewing on their displays and ambient conditions. This is generally impractical.

Commonly owned U.S. patent application No. 61/307,547 filed on 24 Feb. 2010 and entitled DISPLAY MANAGEMENT METHODS AND APPARATUS and No. 61/366,899 entitled DISPLAY MANAGEMENT SERVER and No. 61/364,693 filed on 10 Jul. 2010 and entitled DISPLAY MANAGEMENT METHODS AND APPARATUS describe generating video content having colors and tones suitable for display on a particular display by interpolating or extrapolating between different version of the video content that have been prepared for viewing on other displays. These applications are hereby incorporated herein by reference for all purposes.

For example, one version may be color graded for viewing on a REC 709 display and another version may be color graded for viewing on a VDR display. Rec 709 is a video data format specified by ITU-R Recommendation BT.709, which is hereby incorporated herein by reference. Visual Dynamic Range (VDR) is a format capable of representing an extremely broad range of colors and tones. VDR is described, for example, in co-owned PCT Application No. PCT/US2010/022700 entitled EXTENDED DYNAMIC RANGE AND EXTENDED DIMENSIONALITY IMAGE SIGNAL CONVERSION AND/OR DELIVERY VIA LEGACY VIDEO INTERFACES which is hereby incorporated herein by reference for all purposes. The VDR format can encode the full range of human vision.

For purposes of interpolation/extrapolation or otherwise there is a need for efficient ways to encode for distribution and storage image data (e.g. video data) such that a plurality of versions of the image data which differ in the tones and/or colors chosen to represent features in depicted images can be recovered from the encoded image data. As noted above, such encoded image data can facilitate adapting the appearance of video and other images displayed on different displays to preserve as much as possible a creative intent embodied in the image data.

Since color grading is a time-intensive activity usually requiring the intervention of a skilled person, there is also a need for effective methods and apparatus for producing alternative versions of video content (or other image content) suitable for display on displays other than displays for which the content was color graded.

SUMMARY

This invention has a number of aspects. These include, without limitation: methods for encoding two or more versions of video data or other image data; methods for decoding and extracting versions of video data or other image data from encoded representations; apparatus for encoding two or more versions of video data or other image data; apparatus for decoding and extracting versions of video data or other image data from encoded representations (such apparatus may include, for example, displays, decoders, media players, set-top boxes in cable systems, and the like); methods and apparatus for generating video or other image data carrying new versions of video or other image content;

One aspect of the invention provides a method for generating additional versions of video content. The method comprises obtaining first histogram data for a first version of the video content, obtaining a second version of the video content and obtaining second histogram data for the second version of the video content. The method generates a mapping from the second version of the video content to an additional version of the video content by performing a number of iterations of a progressive histogram matching algorithm The number of iterations is fewer than a maximum number of iterations of the progressive histogram matching algorithm. The method applies the mapping to generate the additional version of the video content from the second version of the video content.

In some embodiments the method comprises generating mappings corresponding to a plurality of different numbers of iterations of the progressive histogram matching algorithm and applying the mappings to generate a corresponding plurality of additional versions of the video content from the second version of the video content.

In some embodiments the method comprises selecting one of the additional versions of the video content to display based upon a signal from an ambient light sensor. In some embodiments the method comprises determining the number of iterations based upon a signal from an ambient light sensor.

In some embodiments generating a mapping from the second version of the video content to an additional version of the video content comprises performing a first number of iterations of a progressive histogram matching algorithm for histogram data corresponding to a first color channel and performing a second number of iterations of a progressive histogram matching algorithm for histogram data corresponding to a second color channel, the second number of iterations different from the first number of iterations. In addition to the exemplary aspects and embodiments described above, further aspects and embodiments will become apparent by reference to the drawings and by study of the following detailed descriptions.

BRIEF DESCRIPTION OF THE DRAWINGS

Non-limiting example embodiments are illustrated in the appended drawings. The embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
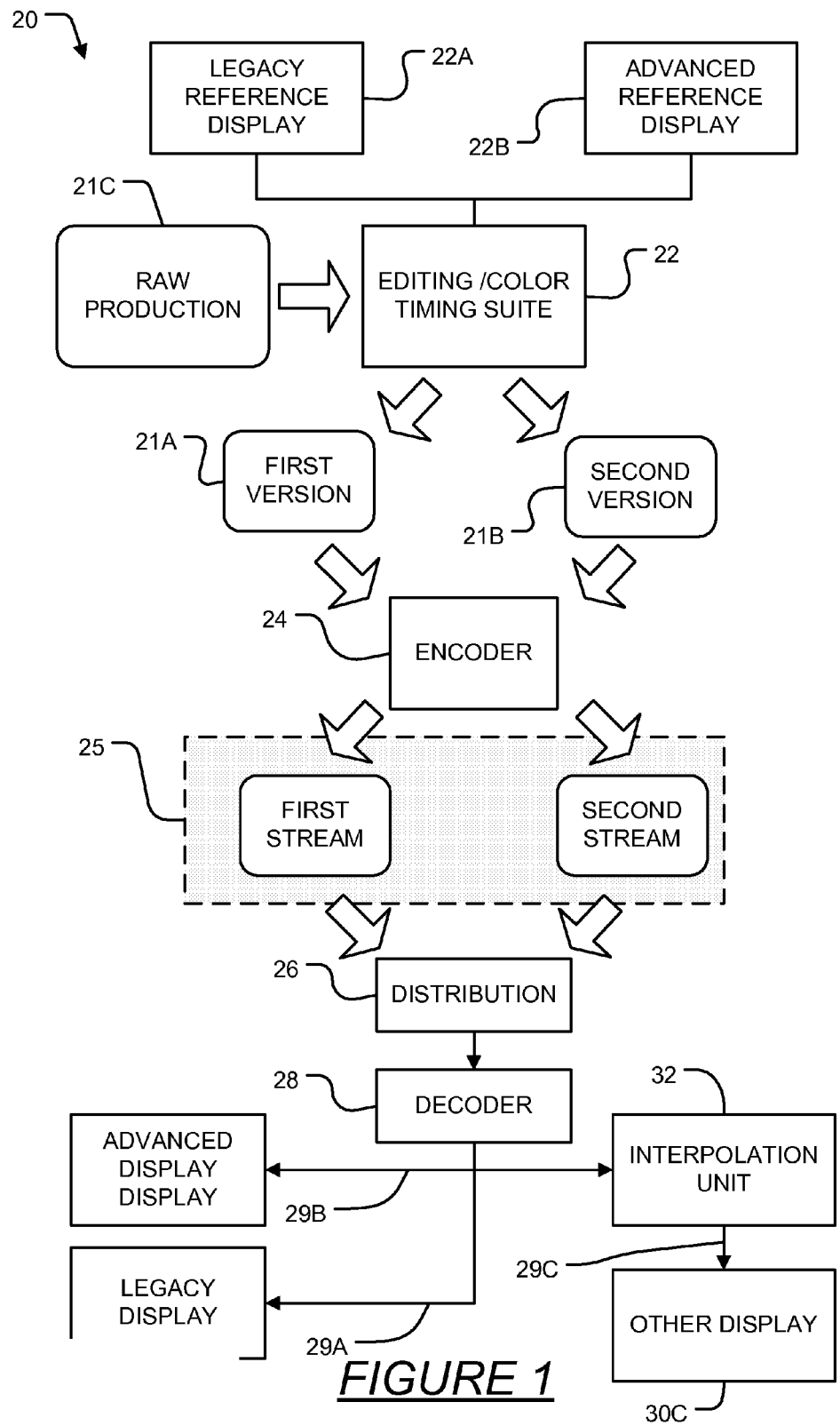
FIG. 1 is a schematic view illustrating a video distribution pipeline that demonstrates one example application of the technology described herein.

FIG. 1 illustrates a video distribution pipeline 20 that demonstrates one example application of the technology described herein. Two versions 21A and 21B of a video production are produced in a studio environment. Each version represents the same original video content (a feature film, television program, advertisement, for example). The versions are produced from input media 21C.

In the illustrated embodiment, first and second versions 21A and 21B are respectively color timed and/or approved for distribution using an editing/color timing suite 22 equipped with reference displays 22A and 22B. Reference displays 22A and 22B may optionally be combined in a single display that can operate in different modes. The versions are encoded for distribution by encoder 24. Encoder 24 provides an encoded output 25. Output 25 may comprise a file, stream or other data structure which can be stored and/or distributed over a distribution channel 26.

In an example embodiment, first and second versions 21A and 21B are respectively a backward-compatible first version viewable on legacy display devices (e.g. televisions that are not configured to generate a signal for display based on both first and second input image data as described herein) and a version best viewed on a display having a broad color gamut and high dynamic range.

Distribution channel 26 may comprise a data communication network (such as a local area network, wide area network, the internet, a cellular data network, a wireless network, a cable television CATV system, a satellite broadcasting system or the like); media (such as DVDs, flash memory, portable data stores, magnetic or optical data storage media or the like); or a bus or other data communication link within a system, for example.

Output 25 is transmitted through distribution channel 26 and decoded by a decoder 28 to recover first and second versions 21A and 21B. In the example embodiment, upon decoding, a stream 29A carrying first version 21A is provided to a legacy display 30A for viewing. A second stream 29B carrying second version 21B is provided to an advanced display 30B for viewing. Both of streams 29A and 29B are provided to an interpolator 32 that generates an interpolated and/or extrapolated stream 29C carrying a hybrid of first version 21A and second version 21B for display on another display 30C.

Figure 2:
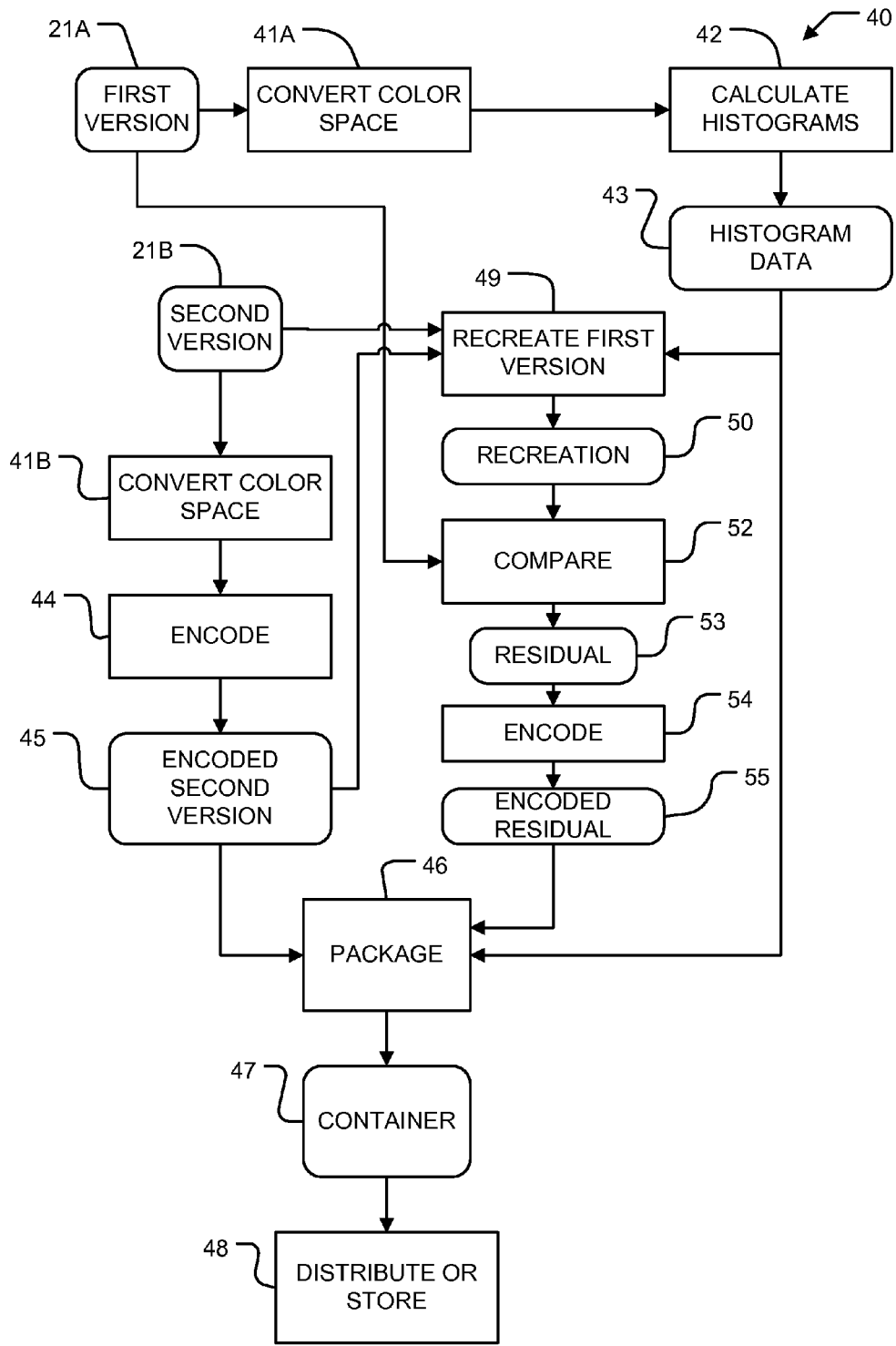
FIG. 2 is a flow chart illustrating an encoding method according to an example embodiment.

FIG. 2 illustrates an encoding method 40 according to an example embodiment. Method 40 converts first version 21A into a suitable color space in block 41A. Block 41A is not needed in the case that first version 21A is already in a suitable color space. A range of color spaces may be used. In some embodiments block 41A converts first version into a color space in which different color channels are substantially decorrelated. This is convenient because it reduces image artifacts in the case where each color channel is treated separately as described below. The color space may be a color opponent space.

Examples of color spaces that are decorrelated enough for many applications include: láâ (described for example in D. L. Ruderman, et al. *Statistics of cone responses to natural images: implications for visual coding*, Journal of the Optical Society of America A, vol. 15, no. 8, pp. 2036-2045, 1998); an image-dependent color space determined, for example, using principal components analysis (PCA) or the Karhunen-Lo ye transform (KLT) (described for example in R. K. Kouassi et al. *Application of the Karhunen-Loeve transform for natural color images analysis*, in Proceedings of the 31st Asilomar Conference on Signals, Systems & Computers (ACSSC '97), vol. 2, pp. 1740-1744, Pacific Grove, Calif., USA, November 1997 and Mircea C. Ionita et al., *Benefits of Using Decorrelated Color Information for Face Segmentation/Tracking* Advances in Optical Technologies Vol. 2008 (2008), Article ID 583687); 010203; YdbDr; YCoCg-R, CIELab.

In block 42 method 40 calculates histograms 43 for first version 21A. In an example embodiment, method 40 computes a set of histograms 43 for each frame of first version 21A. Set 43 may include histogram data for each color channel of first version 21A. The histogram data for each color channel may specify for each of a number of bins how many pixels within the frame or other portion of first version 21A to which the histogram relates have pixel values for the color channel in a range corresponding to the bin. In some embodiments the number of bins is less than the number of possible color channel values. In some embodiments the histogram data is compressed. In some embodiments the number of bins is 250 or fewer. In some embodiments the number of bins is 50 or fewer.

It is not mandatory that the histograms for different color channels have the same number of bins. Histograms having different numbers of bins may be used for different color channels.

Method 40 optionally performs a color space transformation in on second version 21B in block 41B. Block 44 encodes second version 21B to produce encoded second version 45. Block 44 may comprise a lossless encoding or a lossy encoding providing sufficient image quality for the application. For example, block 44 may comprise MPEG encoding of second version 21B.

In block 46, which is combined with block 44 in some embodiments, the histogram data 43 from block 42 is associated with the encoded second version 45. The association may comprise packaging the histogram data 43 and the encoded second version 45 into a common data structure. In an example embodiment, the encoded second version 45 comprises a video stream and the histogram data 43 is encoded as metadata in the video stream. In general, encoded second version 45 and histogram data 43 are provided in a common container 47 (e.g., in a common package, data structure, physical medium or the like). Container 47 may be distributed for viewing at destination displays as illustrated by distribution block 48.

As discussed below, a recreation of first version 21A may be obtained from the encoded second version 45 and histogram data 43 for the first version 21A. This offers significant efficiency in data communication since histogram data 43 is much smaller than first version 21A. In some embodiments, a sufficiently accurate recreation of first version 21A can be obtained without additional data.

In some embodiments, additional information is included in container 47 for use in refining the recreation of first version 21A. The additional information may comprise residual information. FIG. 2 shows an optional block 49 that generates a recreation 50 of first version 21A using second version 21A or encoded second version 45 (only one is required) and histogram data 43. Block 52 compares recreation 49 to first version 21A to yield a residual 53. Block 52 may comprise, for example, subtracting recreation 50 from first version 21A to yield residual 53.

Block 54 encodes residual 53 as encoded residual 55 and stores encoded residual 55 in container 47. Recreation 50 may be closely similar to first version 21A because first version 21A depicts the same image as second version 21B (except for differences in color and tone) and the use of histogram data 43 makes recreation 50 have color and tone like that of first version 21A. Therefore, residual 53 may have many small values. Residual 53 may be encoded in a lossless or a lossy manner in block 54. In some embodiments residual 53 is encoded using an algorithm that does not preserve residual values too small to significantly affect the appearance of a recreation of first version 21A generated using the residual. For example, encoding block 54 may include a quantization step that sets residual values that are lower than a quantization threshold to be zero. In such embodiments, the residual may be greatly compressed when encoded for inclusion in block 47 because most values of the encoded residual will be zero. A separate residual 53 may be obtained and processed for each color channel (a luminance channel, if present, is a color channel).

Figure 3:
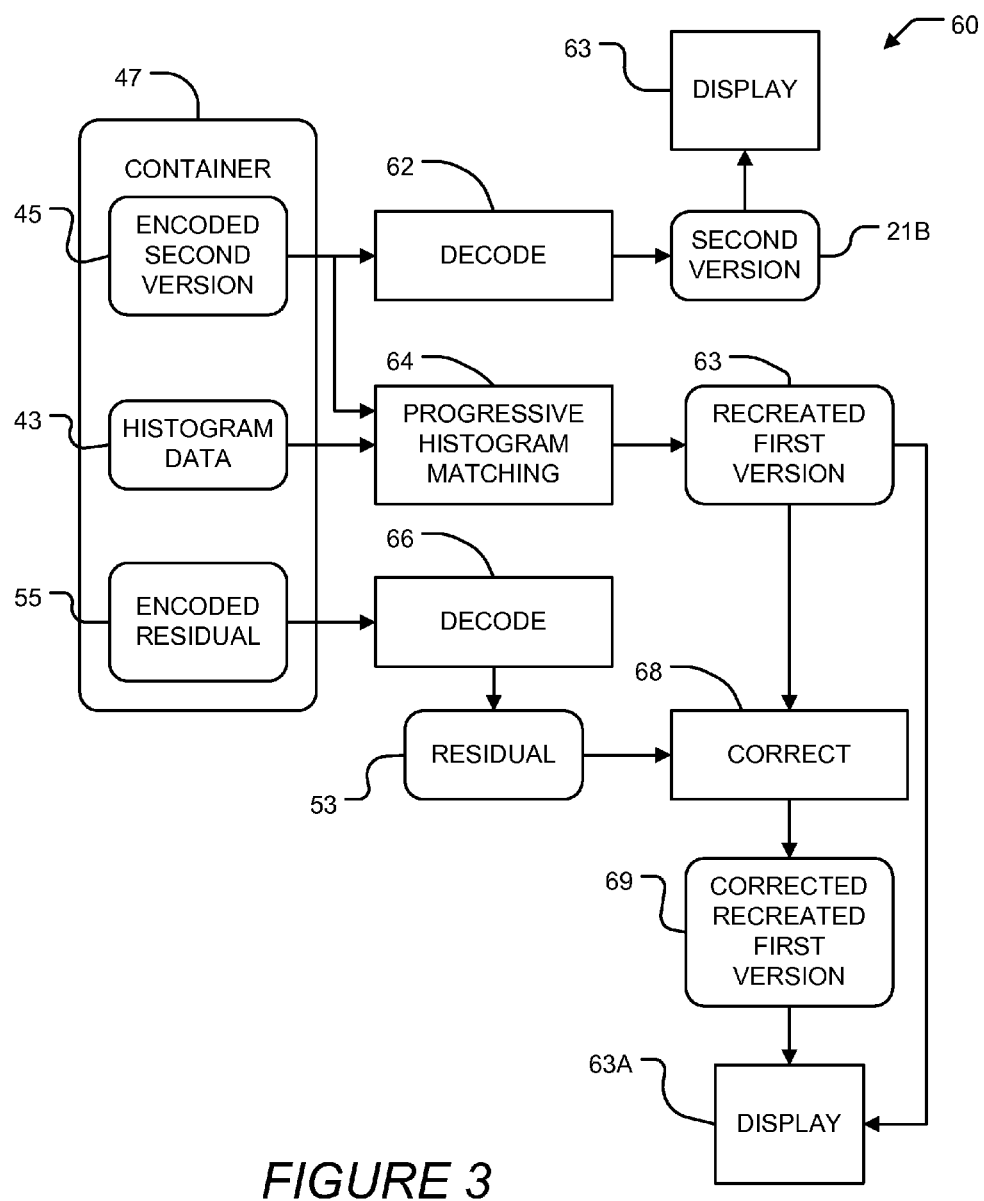
FIG. 3 is a flow chart illustrating a method for recreating a first version of video content from using information in a data container.

FIG. 3 illustrates a method 60 for recreating first version 21A using the information in container 47. This information includes encoded second version 45, histogram data 43 for first version 21A and optionally an encoded residual 53. Method 60 may be applied in block 49 of method 40 and also to obtain a recreation of first version 21A at a downstream location.

In block 62 second version 21B is decoded. The decoded second version 21B may be displayed directly on a display as indicated by block 63.

Block 64 generates a recreation of first version 21A. The recreation is prepared by a method involving determining a histogram transformation which morphs a histogram for second version 21B to make that histogram more like the histogram of first version 21A (from histogram data 43) and then transforming color values for pixels in the second version 21B according to a transformation determined from the histogram transformation. In some embodiments this is performed independently for each channel (e.g. where pixel values in second version 21B are represented in a láâ color space this is performed independently for 1-, á-, and â channels).

Block 64 applies a progressive histogram matching technique to create a recreation 63 of first version 21A. Progressive histogram matching essentially works by modifying color channel values of second version 21B to achieve a closer matching between histogram data for the color-value-modified second version 21B and histogram data 43 for first version 21A. This may be done in a number of stages which match progressively finer-details of the histograms. The number of stages is selected to achieve a recreation 63 acceptably close to first version 21A for the application at hand. Each stage matches the histograms at a different scale.

Optionally method 60 decodes residual 55, if present, in block 66 to obtain residual 53 and applies residual 53 in correction block 68 to obtain corrected recreated first version 69. Corrected recreated first version 69 and/or recreated first version 63 are displayed at block 63A.

In some embodiments, method 60 computes histogram transformations for only select frames of second version 21B. In some such embodiments, color values of non-select frames of second version 21B may be transformed according to a transformation determined from a histogram transformation computed for a select frame of second version 21B. For example, encoded second version 45 may comprise MPEG encoded content in which select frames are designated as key frames, and method 60 may compute histogram transformations for only the key frames of encoded second version 45. Color values of non-key frames of encoded second version 45 may be transformed according to transformations determined from histograms for corresponding key frames. For example, a transformation may be established for a scene between two scene cuts. Using the same transformation for multiple frames advantageously improves temporal stability.

In some embodiments where first version histogram data for non-select frames is not used in recreating first version 21A, method 40 does not compute histogram data for non-select first version frames or does not encode histogram data for non-select first version frames. In such embodiments, residual 53 may or may not be computed, encoded and stored for non-select frames.

Figure 4:
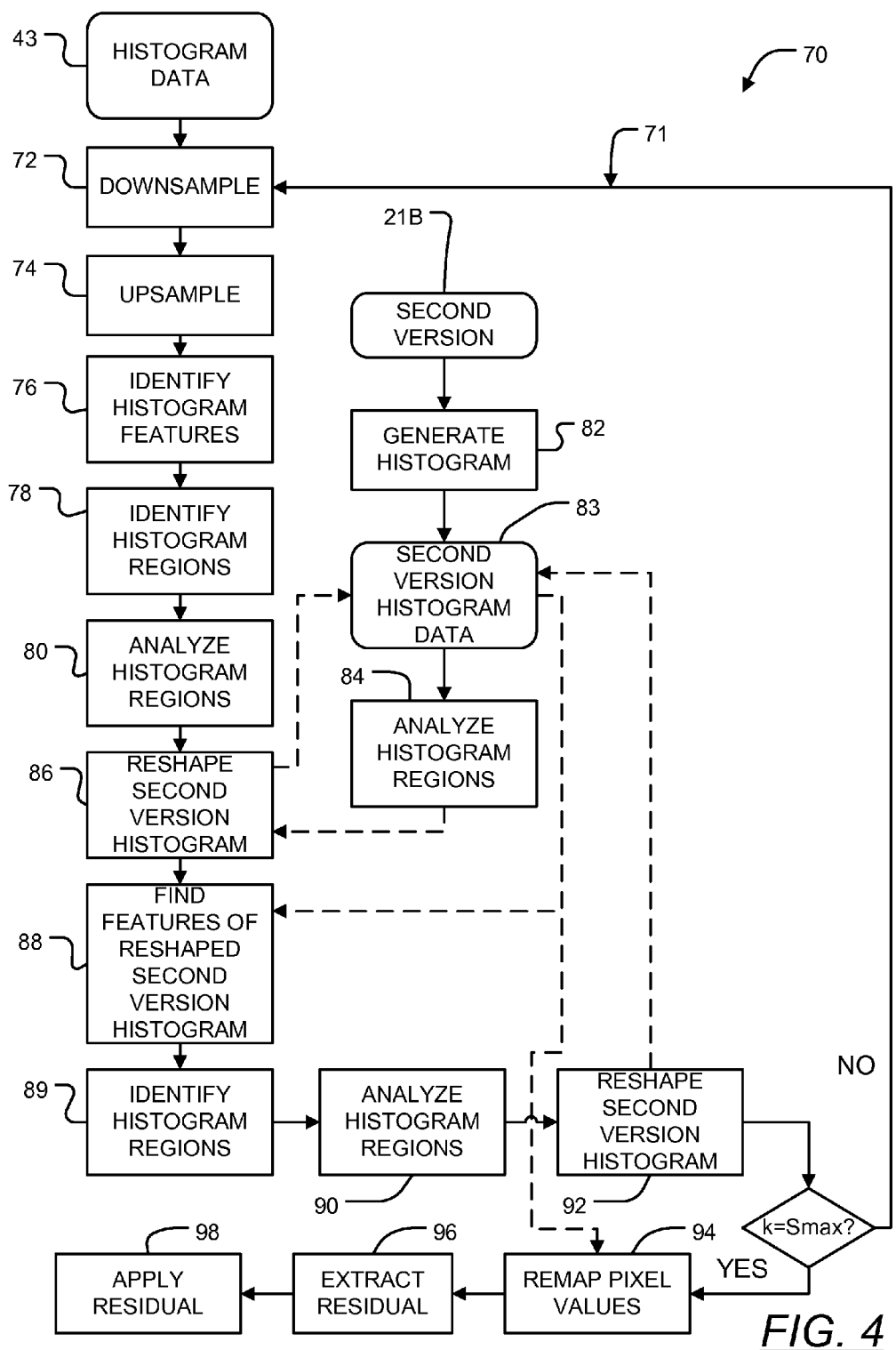
FIG. 4 is a flow chart illustrating an example progressive histogram matching method that may be applied in the method of FIG. 3.

FIG. 4 illustrates an example progressive histogram matching method 70 that may be applied in block 64. Method 70 may be repeated for each color channel Method 70 includes a loop 71 that is repeated for different histogram scales, beginning with coarser scales and repeating for progressively finer scales. Each scale may be associated with a number of bins into which histogram values are accumulated with coarser scales corresponding to fewer bins (more distinct values associated with each bin, on average), and finer scales corresponding to more bins (fewer distinct values associated with each bin, on average).

In this example embodiment, block 72 downsamples histogram data 43 for the current color channel The degree of downsampling (downsampling factor) depends upon the current scale. The scale may be indicated by a scale parameter. Downsampling the histogram data removes high frequency details but preserves gross features of the histogram. Downsampling may comprise bi-cubic interpolation for example.

Block 74 upsamples the downsampled histogram data back to the original size or to another predetermined size. Block 74 is convenient but not mandatory. Where the histogram data is represented at the same resolution for each iteration of loop 71 processing logic can be simplified somewhat.

A wide range of methodologies may be applied to upsample the downsampled histogram data. For example, in an example embodiment upsampling comprises a nearest-neighbor scheme. Applying a nearest-neighbor scheme for upsampling has the advantage of being very simple and producing acceptable results.

Block 76 comprises identifying features in the histogram. Feature identification may comprise, for example, locating zero-crossings of a first order derivative of the histogram. A first order derivative may be obtained by way of forward differencing, for example. The zero crossings may be classified as maxima or minima using a second order derivative of the histogram.

Block 78 identifies regions of the histogram that contain peaks within the histogram based on the features detected in block 76. Each region may, for example, include the bins extending from one minimum of the histogram to a next minimum of the histogram. The last bins selected at either end of a region may be chosen to avoid overlap between adjacent regions.

Block 80 determines statistical properties of each region identified in block 78. Block 80 may comprise, for example, calculating a mean and standard deviation for each region.

Block 82 generates a histogram 83 for second version 21B. Block 84 generates statistical measures (e.g. mean and standard deviation) for histogram 83. Block 86 reshapes histogram 83 so that each region of histogram 83 has a mean and standard deviation matching that of the corresponding region of histogram 43. The reshaping may be performed according to:

$$h_{OUT} = (h_A - w_A \mu_A) \frac{w_B \sigma_B}{w_A \sigma_A} + w_B \mu_B \quad (1)$$

where h is a histogram value, $\sigma$ is a standard deviation for a region, $\mu$ is a mean for a region, the subscript A (as in $h_A$, $\mu_A$ and $\sigma_A$) indicates the histogram 43 for first version 21A the subscript B (as in $h_B$, $\mu_B$ and $\sigma_B$) indicates the histogram for second version 21B and $w_A$ and $w_B$ are weights. Typically the weights are selected such that $w_A + w_B = 1$.

In some embodiments $w_A$ is dependent on the scale. For example, $w_A$ may be increased for iterations in which the scale is finer. For example, in some embodiments $w_A = k/S_{MAX}$ where k is an index representing the scale (e.g. an iteration number for loop 71) and $S_{MAX}$ is the maximum value for k.

Block 88 determines features (e.g. minima) of the updated second version histogram 83. Block 89 identifies regions within the updated second version histogram 83. Block 90 computes statistics (e.g. means and standard deviations) for the regions between minima of updated second version histogram 83. Block 92 reshapes second version histogram 83 in a manner that matches the statistical measures (e.g. means and standard deviations) for the regions of updated second version histogram 83 identified in block 89 to those for the corresponding regions of histogram 43. In each succeeding iteration of loop 71, the updated second version histogram 83 from the previous iteration of loop 71 is used in place of the histogram for second version 21B.

When loop 71 has been performed for a last, finest level of detail (e.g. at the end of the iteration for which $k=S_{MAX}$) the resulting reshaped second version histogram 83 is passed to block 94 which remaps the pixel values from second version 21B to modified values based on the reshaped second version histogram 83. This may be done, for example, by performing the calculation:

$$V_{OUT}(x, y) = v_o \left( C_{OUT}^{-1} \left( C_A \left( \frac{V(x, y) - \min(V) + 1}{R} \right) \right) \right) \quad (2)$$

where $V_{OUT}$ is the pixel color value for the current channel for the pixel at location (x, y) in the recreation of first version 21A, $C_A$ is the cumulative histogram for the histogram of first version 21A, $C_{OUT}^{-1}$ is the inverse cumulative histogram for the reshaped histogram of second version 21B, $v_0$ (i) is the value corresponding to the ith histogram bin of the reshaped second version, min (V) is the minimum for the pixel color value, and R is the width of bins in the histograms. The cumulative histogram C essentially maps a bin index to a cumulative count. The inverse cumulative histogram $C^{-1}$ essentially provides the bin index corresponding to a given cumulative count.

Optional blocks 96 and 98 respectively extract a residual from container and apply the residual to correct the recreation of the first version 21A.

Figure 5:
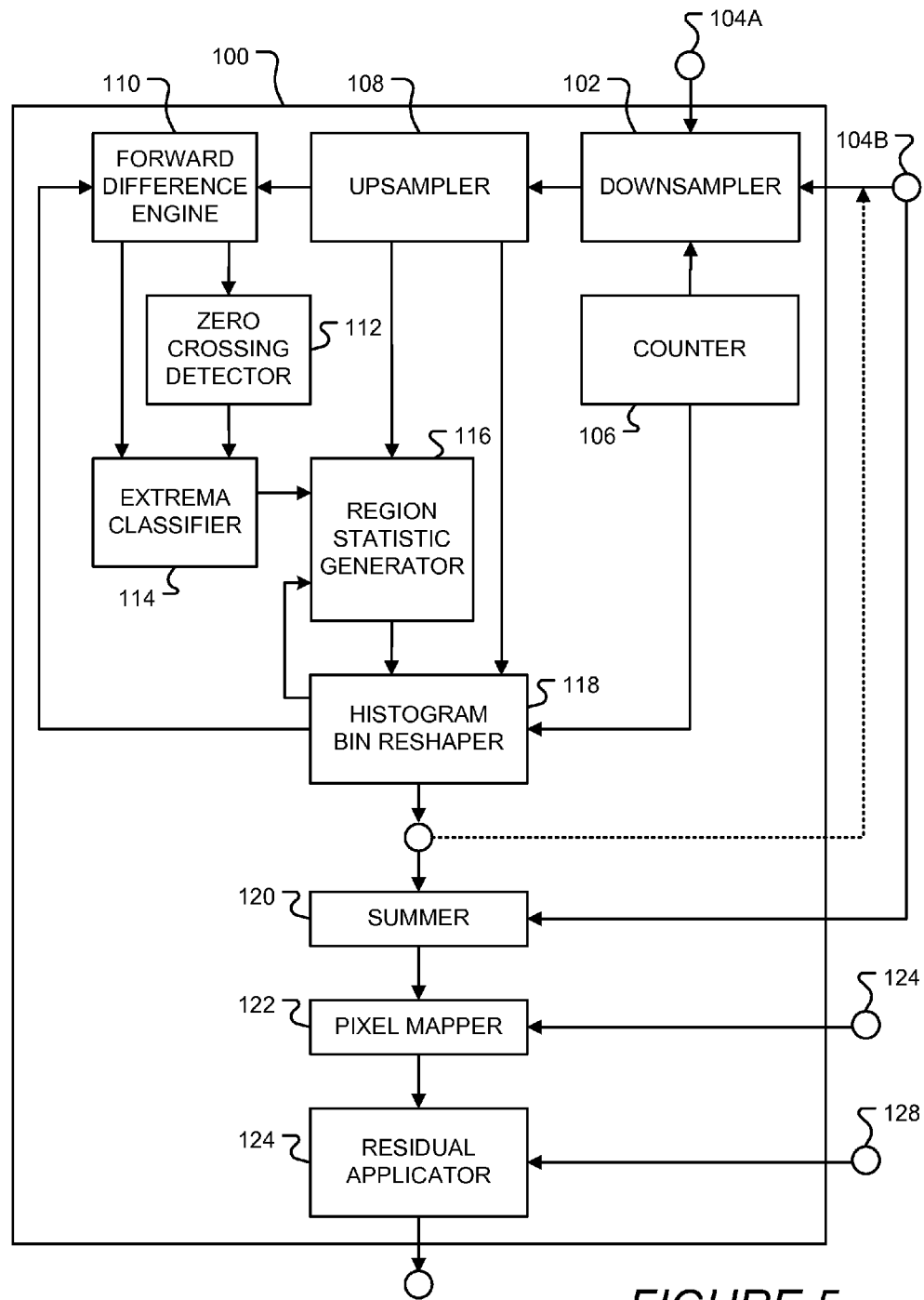
FIG. 5 is a schematic of an example a progressive histogram matching engine.

FIG. 5 is a schematic of an example a progressive histogram matching engine 100. Matching engine 100 comprises a downsampler 102 which is configured to obtain first version histogram data provided at input 104A and second version histogram data provided at input 104B. The degree of downsampling performed by downsampler 102 is variable and based on a count maintained by a counter 106. An optional upsampler 108 is coupled to obtain downsampled first and second version histogram data generated by downsampler 102, and to upsample such downsampled data (e.g., to the original size or to another predetermined size).

A forward difference engine 110 is coupled to obtain first version histogram data generated by upsampler 108. Forward difference engine 110 is configured to determine first-order and second-order forward difference of obtained histogram data. A zero crossing detector 112 is coupled to obtain first-order forward differences determined by forward difference engine 110. Zero crossing detector 112 is configured to identify zero-crossings in obtained first differences. An extrema classifier 114 is coupled to obtain second-order forward differences determined by forward difference engine 110 and to obtain identifications of zero-crossings identified by zero crossing detector 112. Extrema classifier 114 is configured to determine which zero crossings correspond to local minima based on the second-order forward differences corresponding to the zero crossings. As will be apparent in view of descriptions of methods herein, where zero crossing detector 112 and extrema classifier 114 operate on first version histogram data, the resulting minima identified by extrema classifier 114 comprise minima in first version histogram data.

A region statistic generator 116 is coupled to obtain minima identified by extrema classifier 114 and first and second version histogram data generated by upsampler 108. Region statistic generator 116 is configured to determine, for each obtained set of obtained histogram data, mean and standard deviation statistics for regions thereof defined by obtained minima. A histogram bin reshaper 118 is coupled to obtain region-specific mean and standard deviation statistics generated by region statistic generator 116. Bin reshaper 118 is coupled to receive second version histogram data generated by upsampler 108. Bin reshaper 118 is configured to reshape histogram bins of obtained histogram data based on obtained region-specific mean and standard deviation statistics and based on the count maintained by counter 106. For example, where bin reshaper 118 operates on second version histogram data, it may generate reshaped second version histogram data according to Equation (1), above, using obtained region-specific mean and standard deviation statistics for first and second version histogram data and weights derived from the count maintained by counter 106.

Forward difference engine 110 is further coupled to obtain re-shaped histogram data generated by bin reshaper 118. As will be apparent in view of the foregoing descriptions of forward difference engine 110, zero crossing detector 112 and extrema classifier 114, where these components operate on reshaped second version histogram data, the resulting minima identified by extrema classifier 114 comprise minima in reshaped second version histogram data.

Region statistic generator 116 is coupled to obtain reshaped second version histogram data generated by bin reshaper 118. Progressive histogram matching engine 100 is configured such that bin reshaper 118 reshapes reshaped second version histogram data based on mean and standard deviation statistics of first version histogram data and reshaped second version histogram data determined for regions thereof defined by minima in reshaped second version histogram data.

Iteratively reshaped second version histogram data generated by bin reshaper 118 may be coupled back to second version input 104B and progressive histogram matching engine 100 operated to perform a subsequent iterations of histogram matching.

A summer 120 is coupled to obtain iteratively reshaped second version histogram data generated by bin reshaper 118. Summer 120 is coupled to obtain second version histogram data provided at input 104B. Summer 120 is configured to sum obtained histogram data to yield cumulative histogram data. For example, where summer 120 obtains second version histogram data provided at input 104B and iteratively reshaped second version histogram data generated by bin reshaper 118, it generates second version cumulative histogram data and iteratively reshaped cumulative second version histogram data.

A pixel mapper 122 is coupled to obtain cumulative histogram data generated by summer 120, and to obtain second version pixel data provided at input 124. Pixel mapper 122 is configured to map values of obtained pixel data based on obtained histogram data. In some embodiments, pixel mapper 122 is configured to generate mapped pixel data according to Equation (2). For example, where pixel mapper 122 obtains second version cumulative histogram data and iteratively reshaped cumulative second version histogram data, it may map values of obtained second version pixel data according to Equation (2) to yield mapped pixel data which recreates first version pixel data.

An optional residual applicator 126 is coupled to obtain mapped data generated by pixel mapper 122 and to obtain residual data provided at input 128. Residual applicator 126 is configured to apply residual data to obtained mapped pixel data. Where mapped pixel data generated by pixel mapper 122 recreates first version pixel data, residual applicator 126 may correct the recreation of the first version pixel data.

Progressive histogram matching engine 100 and components thereof may be configured to perform described operations in serial or parallel. Progressive histogram matching engine 100 and components thereof may comprise communication channels (e.g., data bus, inter-process communication facilities, and the like) and data storage (e.g., memories) to facilitate operations and cooperation between components described above, and to facilitate performance of steps of methods disclosed herein. In some apparatus embodiments, components of histogram matching engine 100 are multiply instantiated, such as to facilitate parallel processing and/or pipelined processing, for example. Components of histogram matching engine 100 may be combined and/or split for ease of implementation or otherwise.

Techniques for progressive histogram matching are described, for example, in Reinhard *Color Transfer between Images* IEEE CG & A special issue on Applied perception, Vol. 21, No. 5, pp. 34-41, September-October 2001; Pouli et al. *Progressive Histogram Reshaping for Creative Color Transfer and Tone Reproduction* Proceedings of the ACM Symposium on Non-Photorealistic Animation and Rendering, Annecy, France, June 7-10, pp. 81-90, 2010; and Pouli et al., *Progressive Color Transfer for Images of Arbitrary Dynamic Range* Computers & Graphics 35 (2011) pp. 67-80, all of which are hereby incorporated herein by reference for all purposes.

It can be appreciated that the methods and apparatus described above may be applied in various ways. For example, consider the case where the second version is a version of video content that is color timed for advanced displays and the first version is a version of video content that has been color timed for display on lower performance displays (by way of example Rec709 displays). In this case, the advanced display is provided a signal that contains a version of the content that is specifically color timed for optimum viewing on the advanced display. However, with only the small addition of histogram data for the first version, it is possible to recreate the first version for display on a legacy display or a display having reduced color gamut, dynamic range or other capabilities.

In alternative applications the roles of the first and second versions are reversed. In such applications the first version is a version of video content that is color timed for advanced displays and the second version is a version of video content that has been color timed for display on lower performance displays.

In either case, versions of the content for display on displays having other capabilities may be generated by interpolation and/or extrapolation from the second version and the reconstructed first version.

Application of progressive histogram matching provides an alternative way to generate versions of the content for viewing on displays having capabilities different from the capabilities of the displays for which the first and second versions are color timed. Such applications can be performed in combination with the encoding/decoding methods described above or independently. For example, a second version of video content may be distributed together with histogram data for a first version of the same video content. It may be desired to display the video content on a particular display. Based upon characteristics of the display and information characterizing the first and second versions (such as information regarding color gamut and dynamic range of the first and second versions) an index is generated. The index is indicative of how close the characteristics of the target display are to the characteristics of the first and second versions of the video content (e.g. whether the target display characteristics are closer to a reference display used to color time the first version or closer to a reference display used to color time the second version).

As noted above, progressive histogram matching iterates matching a histogram from the second version to the histogram for the first version at successive levels of detail. Where it is desired to recreate first version 21A as closely as practical, the iteration proceeds from k=1 to k=$S_{MAX}$. Terminating the matching at an iteration prior to $S_{MAX}$ and/or reducing the change of scale between iterations will result in a version of the content that has color characteristics between those of the second version and the recreation of first version 21A that would have been obtained by performing all $S_{MAX}$ iterations of the matching algorithm.

In some embodiments, reshaped second version histograms for different color channels are generated using different numbers of iterations and/or different changes of scale between iterations. For example, given a target display having luminance-related capabilities that are relatively closer to the first version than the target display's chrominance-related capabilities, progressive histogram matching from a second version toward a first version for the target display may be performed independently for a luminance channel and chrominance channels, and relatively more histogram matching iterations performed on the luminance channel histogram than on the chrominance channel histograms. The luminance pixel values may then be remapped from the second version to modified values based on the relatively more reshaped luminance second version histogram and the chrominance values remapped from the second version to modified values based on the relatively less reshaped chrominance second version histograms.

For another example, given a target display having luminance-related capabilities that are relatively closer to the first version than the target display's chrominance-related capabilities, progressive histogram matching from a second version toward a first version for the target display may be performed independently for a luminance channel and chrominance channels, and relatively greater changes in scale per iteration applied to the histogram matching iterations performed on the luminance channel histogram than on the chrominance channel histograms. The luminance pixels values may then be remapped from the second version to modified values based on the relatively more reshaped luminance second version histogram and the chrominance values remapped from the second version to modified values based on the relatively less reshaped chrominance second version histograms.

In some embodiments, multiple different versions of video content may be prepared at a color grading station or elsewhere by a method which involves creating first and second versions of the same video content which differ in the particular color values assigned to pixels. The first and second versions may, for example, be obtained by color grading for viewing on different displays and/or for viewing under different ambient conditions. Histograms are calculated for the first and second versions. Progressive histogram matching is then performed. Mappings which take color values from one or the other of the first and second versions are created for each iteration of the progressive histogram matching (or for one or more selected iterations of the progressive histogram matching). Those mappings are then applied to create additional versions of the video content in which the dynamic range and/or chromaticities are intermediate the first and second versions.

In some embodiments where the first and second versions correspond to different ambient lighting conditions, different numbers of iterations may be matched to different ambient light levels. In some embodiments information indicating the correspondence between iterations of the histogram matching algorithm is encoded as metadata. This metadata may be applied in combination with a measure of the ambient lighting to determine a number of iterations to be used in recreating a version of the content for display.

One application of this method automatically creates different versions of video content for different ambient lighting conditions. A first version of the video content is color graded for viewing in a dark environment. A second version of the video content is color graded for viewing in a bright viewing environment. Versions of the video content suitable for viewing under intermediate ambient lighting conditions can be obtained by performing different numbers of iterations of the progressive histogram matching and/or by varying the change in scale between successive iterations of the progressive histogram matching. In some embodiments one of the versions is selected for display in response to a signal from an ambient light sensor. In some embodiments the number of iterations of progressive histogram matching that are performed and/or the change in scale between iterations is controlled in response to a signal from an ambient light sensor.

Other methods for recreating first version 21A from second version 21B and a histogram for first version 21A may also be applied. For example, a recreation of first version 21A may be generated using a method as described in Senanayake C, et al. *Colour transfer by feature based histogram registration*. In: British machine vision conference. British Machine Vision Association; 2007 which is hereby incorporated herein by reference.

The above detailed description of examples of the technology is not intended to be exhaustive or to limit the system to the precise form disclosed above. While specific examples of, and examples for, the system are described above for illustrative purposes, various equivalent modifications are possible within the scope of the system, as those skilled in the relevant art will recognize. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

Image processing and processing steps as described above may be performed in hardware, software (including 'firmware') or suitable combinations of hardware and software. Certain implementations of the invention comprise computer processors which execute software instructions which cause the processors to perform a method of the invention. For example, one or more processors in a video workstation, set top box, display, video projector, transcoder or the like may implement methods as described herein by executing software instructions in a program memory accessible to the processors. For example, such image processing may be performed by a data processor (such as one or more microprocessors, graphics processors, digital signal processors or the like) executing software and/or firmware instructions which cause the data processor to implement methods as described herein. The software and other modules described herein may be executed by a general-purpose computer, e.g., a server computer or personal computer. Furthermore, aspects of the system can be embodied in a special purpose computer or data processor that is specifically programmed, configured, or constructed to perform one or more of the computer-executable instructions explained in detail herein. Such methods may also be performed by logic circuits which may be hard configured or configurable (such as, for example logic circuits provided by a field-programmable gate array "FPGA").

Software and other modules may reside on servers, workstations, personal computers, tablet computers, PDAs, color-grading tools, video projectors, audio-visual receivers, displays (such as televisions), digital cinema projectors, media players, and other devices suitable for the purposes described herein. Those skilled in the relevant art will appreciate that aspects of the system can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics (e.g., video projectors, audio-visual receivers, displays, such as televisions, and the like), set-top boxes, color-grading tools, network PCs, mini-computers, mainframe computers, and the like.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures (e.g., containers) described herein may comprise computer files, variables, programming arrays, programming structures, or any electronic information storage schemes or methods, or any combinations thereof, suitable for the purposes described herein.

The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, media such as magnetic data storage media including floppy diskettes, hard disk drives, optical data storage media including CD ROMs, DVDs, electronic data storage media including ROMs, flash RAM, hardwired or preprogrammed chips (e.g., EEPROM semiconductor chips), nanotechnology memory, or the like. The computer-readable signals on the program product may optionally be compressed or encrypted. Computer instructions, data structures, and other data used in the practice of the technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Where a component (e.g. a display conformer, color grading adjustment module, display model, software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The technology provided herein can be applied to systems other than the example systems described above. The elements and acts of the various examples described above can be combined to provide further examples. Aspects of the system can be modified, if necessary, to employ the systems, functions, and concepts of the various references described above to provide yet further examples of the technology.

These and other changes can be made to the system in light of the above Detailed Description. While the above description describes certain examples of the system, and describes the best mode contemplated, no matter how detailed the above appears in text, the system can be practiced in many ways. Details of the system and method for classifying and transferring information may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Detailed Description section explicitly and restrictively defines such terms. Accordingly, the actual scope of the system encompasses not only the disclosed examples, but also all equivalent ways of practicing or implementing the technology under the claims.

From the foregoing, it will be appreciated that specific examples of systems and methods have been described herein for purposes of illustration, but that various modifications may be made without deviating from the spirit and scope of the invention. Those skilled in the art will appreciate that certain features of embodiments described herein may be used in combination with features of other embodiments described herein, and that embodiments described herein may be practised or implemented without all of the features ascribed to them herein. Such variations on described embodiments that would be apparent to the skilled addressee, including variations comprising mixing and matching of features from different embodiments, are within the scope of this invention.

As will be apparent to those skilled in the art in the light of the foregoing disclosure, many alterations, modifications, additions and permutations are possible in the practice of this invention without departing from the spirit or scope thereof. The embodiments described herein are only examples. Other example embodiments may be obtained, without limitation, by combining features of the disclosed embodiments. It is therefore intended that the following appended claims and claims hereafter introduced are interpreted to include all such alterations, modifications, permutations, additions, combinations and sub-combinations as are within their true spirit and scope.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for generating additional versions of video content, the method comprising:
   obtaining first histogram data for a first version of the video content adapted to be viewed in a first ambient lighting condition;
   obtaining a second version of the video content adapted to be viewed in a second ambient lighting condition; wherein the first and second ambient lighting conditions are different;
   obtaining second histogram data for the second version of the video content;
   generating a mapping from the second version of the video content to an additional version of the video content by performing a number of iterations of a progressive histogram matching algorithm, the number of iterations being fewer than a maximum number of iterations of the progressive histogram matching algorithm; wherein the number of iterations is determined based upon a signal from an ambient light sensor representing a third ambient light condition; wherein generating a mapping comprises determining a histogram transformation which morphs the second histogram data to become more like the first histogram data; and
   applying the mapping to generate the additional version of the video content from the second version of the video content; wherein the additional version is a recreation of the first version.

2. A method according to claim 1 comprising generating mappings corresponding to a plurality of different numbers of iterations of the progressive histogram matching algorithm and applying the mappings to generate a corresponding plurality of additional versions of the video content from the second version of the video content.

3. A method according to claim 2 comprising selecting one of the additional versions of the video content to display based upon the signal from the ambient light sensor.

4. A method according to claim 1 wherein the first and second histogram data each comprise a plurality of histograms corresponding to different color channels of the corresponding video content.

5. A method according to claim 4 wherein generating a mapping from the second version of the video content to an additional version of the video content comprises performing a first number of iterations of a progressive histogram matching algorithm for histogram data corresponding to a first color channel and performing a second number of iterations of a progressive histogram matching algorithm for histogram data corresponding to a second color channel, the second number of iterations different from the first number of iterations.

6. A method according to claim 5 wherein the first and second color channels are substantially de-correlated.

7. A method according to claim 5 wherein the first color channel comprises a luminance channel and the second color channel comprises a chrominance channel.

8. A method according to claim 1 wherein:
   each of a plurality of numbers of iterations is associated with an ambient light level; and
   the number of iterations of the progressive histogram matching algorithm is determined based upon a measure of the third ambient lighting condition and the plurality of numbers of iterations associated with the plurality of ambient light levels.

9. A system for generating additional versions of video content, the system comprising:
   means for obtaining first histogram data for a first version of the video content adapted to be viewed in a first ambient lighting condition;
   means for obtaining a second version of the video content adapted to be viewed in a second ambient lighting condition; wherein the first and second ambient lighting conditions are different;
   means for obtaining second histogram data for the second version of the video content;
   means for generating a mapping from the second version of the video content to an additional version of the video content by performing a number of iterations of a progressive histogram matching algorithm, the number of iterations being fewer than a maximum number of iterations of the progressive histogram matching algorithm; wherein the number of iterations is determined based upon a signal from an ambient light sensor representing a third ambient light condition; wherein the means for generating a mapping comprise means for determining a histogram transformation which morphs the second histogram data to become more like the first histogram data; and means for applying the mapping to generate the additional version of the video content from the second version of the video content; wherein the additional version is a recreation of the first version.

10. An apparatus, comprising:

a processor; and a non-transitory computer readable storage medium comprising instructions encoded and stored therewith, which when executing on a processor, causes, controls, programs or configures the processor to perform or control a process for generating additional versions of video content, the video generation process comprising:

obtaining first histogram data for a first version of the video content adapted to be viewed in a first ambient lighting condition;

obtaining a second version of the video content adapted to be viewed in a second ambient lighting condition; wherein the first and second ambient lighting conditions are different;

obtaining second histogram data for the second version of the video content;

generating a mapping from the second version of the video content to an additional version of the video content by performing a number of iterations of a progressive histogram matching algorithm, the number of iterations being fewer than a maximum number of iterations of the progressive histogram matching algorithm; wherein the number of iterations is determined based upon a signal from an ambient light sensor representing a third ambient light condition; wherein generating a mapping comprises determining a histogram transformation which morphs the second histogram data to become more like the first histogram data; and applying the mapping to generate the additional version of the video content from the second version of the video content; wherein the additional version is a recreation of the first version.

* * * * *